July 1, 1969 S. R. SMITH 3,452,878
STORAGE AND DISPLAY SYSTEM
Filed May 2, 1966 Sheet 1 of 3

INVENTOR.
STEVEN R. SMITH
BY Warren T. Jessup
ATTORNEY

STEVEN R. SMITH
INVENTOR.

BY Warren T. Jessup
ATTORNEY

INVENTOR.
STEVEN R. SMITH
BY Warren T. Jessup
ATTORNEY

United States Patent Office 3,452,878
Patented July 1, 1969

3,452,878

STORAGE AND DISPLAY SYSTEM

Steven R. Smith, 2214 Sunset Blvd.,
Los Angeles, Calif. 90026

Filed May 2, 1966, Ser. No. 546,878
Int. Cl. A47g *19/08*
U.S. Cl. 211—41 8 Claims

ABSTRACT OF THE DISCLOSURE

A storage rack is provided for holding flat rectangular containers, such as magnetic tape cartridges, or the like, neatly in a horizontal stack, with the cartridges being individually removable. The storage rack may conveniently be mounted under the dashboard of a motor vehicle, or on the horizontal underside of any other appropriate support.

This invention relates in general to storage containers and devices, and more specifically to a rack device for organizing, protecting and holding replaceable and disposable containers, and various equipment, tools and devices.

Cartridge tapes are supplementing, and in some instances replacing, the conventional disc record for the studio and home, and are finding wide popularity in sterephonic systems in automobiles. The selection of replaceable film cartridges is growing larger, and whenever a family is involved, the number of such tapes may reach a considerable magnitude with commensurately great volume of storage required. Hence, it is an object of this invention to provide a means for storing such tape cartridges in an orderly manner on a surface which presents the cartridges in convenient position for viewing to select the cartridge, but employing space not otherwise occupied within a motor vehicle.

It is a further object of the invention to provide a storage and display system for use in the home, boat, office, etc., wherein the tape cartridges are held in an orderly and harmonious relationship. The system may also be used to store continuous motion picture film cartridges and data computer tapes.

It is a further object of this invention to provide an economy storage system wherein the tapes may be held in compact relationship to occupy a minimum storage in the tape library of a broadcasting studio.

Furthermore, in the home, and particularly in the bathroom area of the home, a considerable number of containers are generally collected to hold various powders, liquids, and ointments for medication and general toiletry. These bottles become a problem in that they occupy excessive amounts of shelf space.

It is a further object of this invention to provide a rack storage system for a disposable and replaceable series of containers of uniform configuration in order to facilitate good housekeeping.

In accordance with these and other objects which will become apparent hereinafter, the best mode contemplated for the present invention is disclosed in the accompanying drawings wherein.

In FIGURES 1 through 12, the invention is illustrated as applied to a replaceable magnetic tape cartridge, or the like, and the adaptation of this system for use with cosmetic and other type containers will be within the skill of the artisan.

Figures 1, 2:
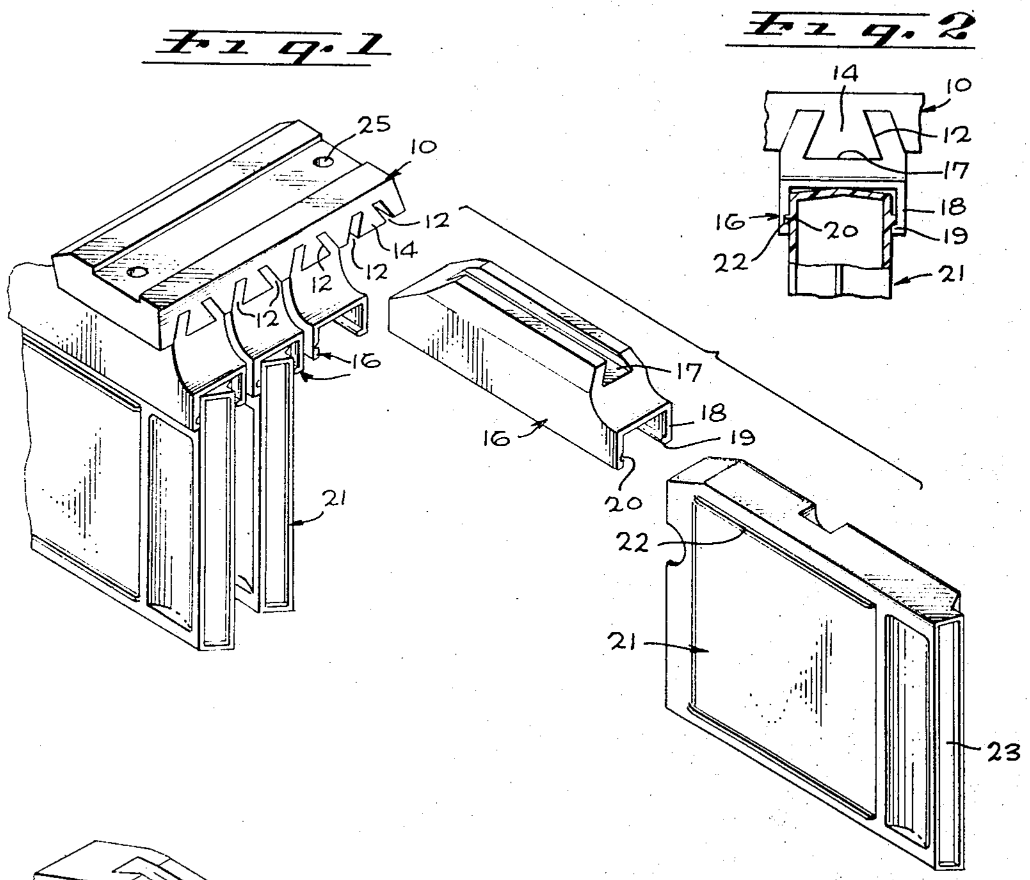
FIGURE 1 is an exploded illustration of a system as employed in an automobile or home to secure a plurality of removable cartridges to an overhead support.
FIGURE 2 is a front view of one of the tracks and retainers, with a cartridge partially broken away to illustrate interconnection.

In FIGURE 1, a base 10 is provided with a plurality of parallel tracks consisting of grooves 12 forming dovetails 14. The dovetail 14 acts as a lateral projection serves as a type of retainer for a properly formed companion member.

In the FIGURE 1, an adapter piece 16 is secured to the dovetail 14 by the provision of a longitudinal dovetail slot 17. The slot is a sliding tight fit upon the dovetail 14 in order to retain the adapter piece 16 in position until it is desired that it be removed.

The adapter piece has lower side walls 18, which carry a longitudinal ridge or shelf 19 on one wall and a longitudinal groove 20 on the other wall.

A cartridge or container 21, which is representative of a suitable container, and which may be supported by the system of the present invention, is a standard stereo tape cartridge which is currently employed in automotive stereo players and has a rib 22 on the side in view to fit into the groove 20. On the opposite side, not shown, is a groove to accept the ridge 19. Hence, the container 21 and the adapter piece 16 have a longitudinally slidable, polarized, interfit for removable support of the container cartridge 21 during periods of storage.

The cartridge 21 has an indicia panel 23 on the forward end which serves to indicate the particular cartridge container when several are situated in side by side relationship in the carrier.

Screw holes 25 in the base 10 make the attachment of the system to the undersurface of an automobile dash, or the bottom of a furniture shelf a simple installation procedure.

Figure 3:
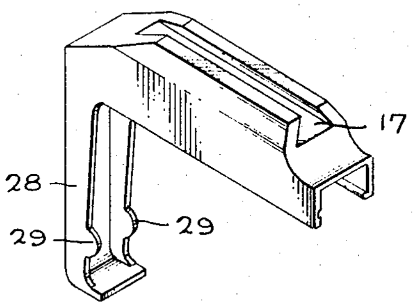
FIGURE 3 is a perspective view of an alternate type of retainer.

In FIGURE 3, an alternate type of retainer means 16 is shown in that a leg 28 provides an "L"-shaped retainer and provides a means for clamping the end of the cartridge 21 in position. Detents 29, carried by the leg 28, provide a retention grip of the removable container.

Figure 4:
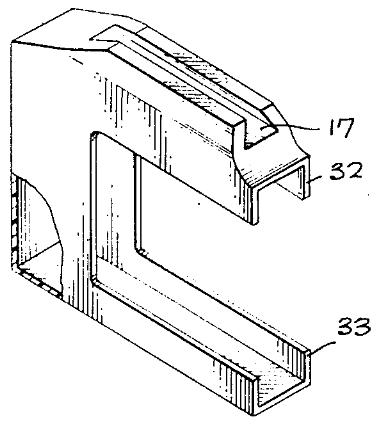
FIGURE 4 is a perspective view of an alternate type retainer.

In FIGURE 4, a further modification is shown in the form of a C-shaped retainer, having an open end. The upper portion of the retainer is provided by walls which create a guide 32 without the internal rib 19 and notch 20 of FIG. 1. Hence, this does not support, but rather simply guides a container cartridge.

A bottom trough 33 is provided to support the weight of the cartridge, and internal detent surfaces may be provided if retention against sliding is desired. The elongated trough 33 may be canted sufficiently to provide a spring action producing a space between the openings less than a normal dimension of a container cartridge, but yieldable to admit the cartridge in a clamping grip.

Figure 5:
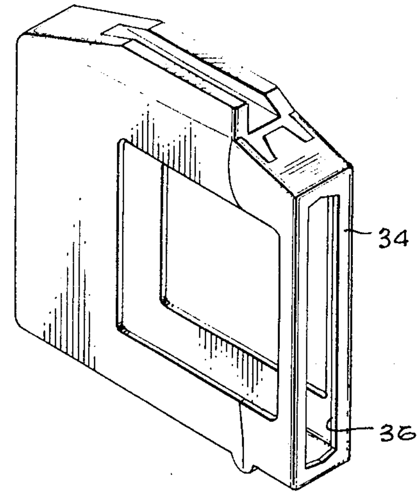
FIGURE 5 is a perspective view of an alternate type retainer.

In FIGURE 5, the holder of FIGURE 4 is shown provided with a door 34, having an inspection opening 36 to reveal the indicia panel 23.

Figure 6:
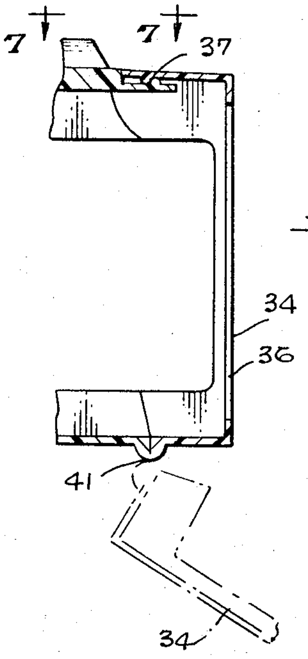
FIGURE 6 is a section through the forward portion of the retainer shown in FIGURE 5, considerably enlarged.
Figure 7:
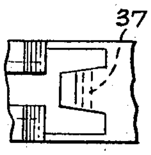
FIGURE 7 is a section taken substantially along line 7—7 of FIGURE 6.

In FIGURE 6, it is seen that the door 34 is secured to the body by a hinge 41. By molding the body of modern, resilient, plastic resins, this type of hinge is a useful and practical construction. It will be appreciated that any type of hinge may be employed, ir if desired, the door may be completely separable from the body. Detents 37 on body and door, respectively, serve to provide a snap closure.

Figure 8:
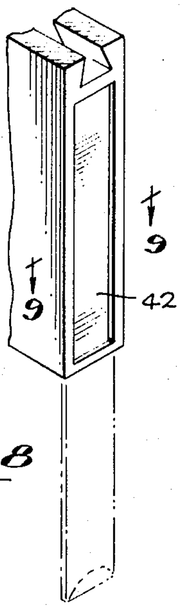
FIGURE 8 is a perspective view of the forward end of a container showing an alternate type door closure.
Figure 9:
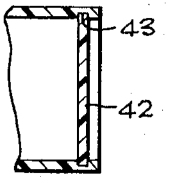
FIGURE 9 is a section taken along line 9—9 of FIGURE 8.

The FIGURES 8 and 9 show a still further door alternate in which a slide 42 is held by guide notches 43, as best shown in FIGURE 9.

Figure 10:
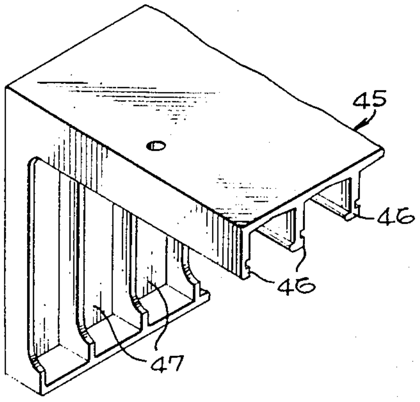
FIGURE 10 is a perspective view of an alternate construction to that shown in FIGURE 1.

In FIGURE 10, a unitary bracket 45 provides partition walls 46, and these walls 46 are designed to carry longitudinal rails and grooves in a manner described with respect to the adapter piece 16. The back wall construction 47 provides a back limit, and also may be provided with detents if resilient detention is desired.

Figure 11:
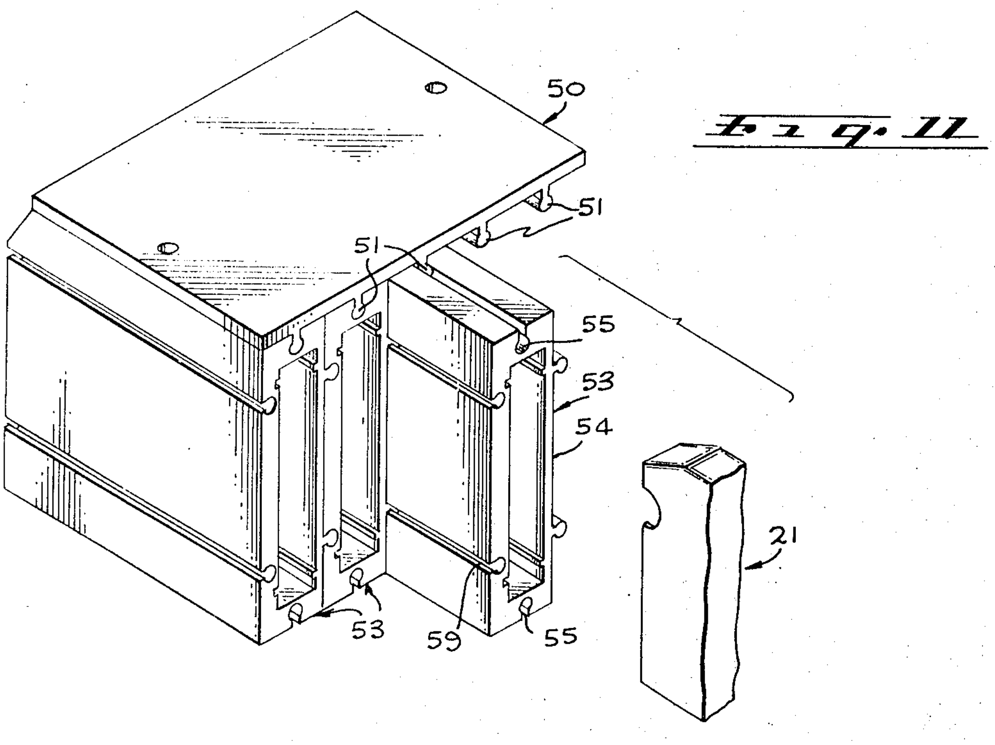
FIGURE 11 is a further alternate construction to that shown in FIGURE 1.
Figure 12:
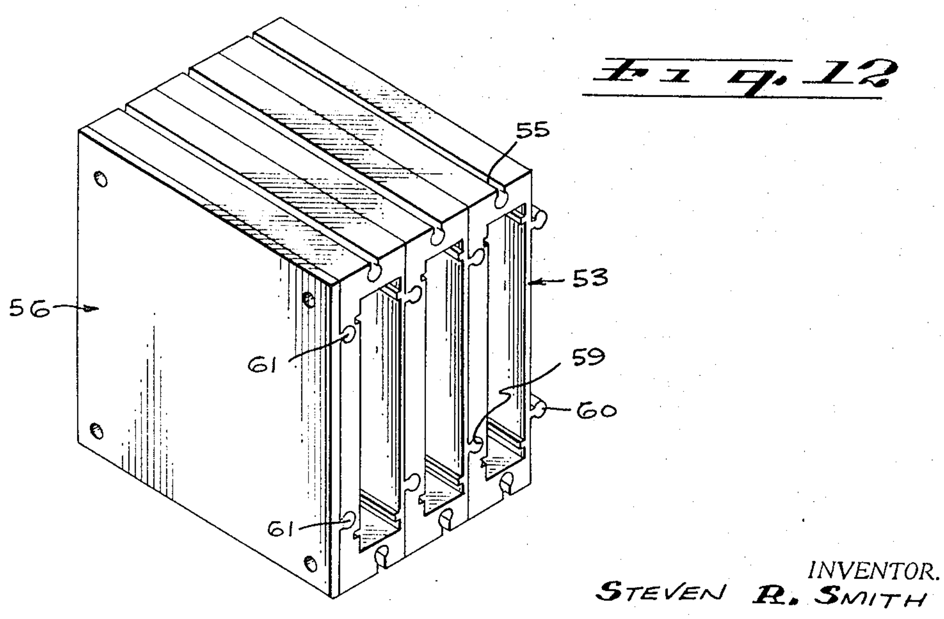
FIGURE 12 is an alternate support system for the use of the retainers shown in FIGURE 11.

FIGURES 11 and 12 illustrate two closely-related embodiments for storage of a great number of devices in a close compact form. These embodiments will be most suitable for studio use. In FIGURE 11, a hanger 50 may be secured to a cross-shelf support. The hanger has a plurality of rails 51, having key hole cross section. The ends of the rails are cylindrical in form, and, therefore, provide lateral projections to which a suitable form may be secured.

The retainer means of this embodiment is a housing 54, having end wall grooves 55 for slidable engagement with the rails 51.

An alternate type hanger 56 is useful for the attachment to a shelf wherein a long, vertical column of containers is desired, or for attachment to a vertical wall for lateral projection of cartridges secured to one another. This is the position of the device in FIGURE 12.

In order to provide the interlock of the individual cartridge holders 53 in this manner, each of the cartridge holders is provided with a pair of grooves 59 on one broad side, and a pair of rails 60 on the other. Rails 60 are positioned and dimensioned to fit the grooves 59, and, hence, a series of the cartridge containers 53 may be built up. Then, by the provision of rails 61 on hanger 56, the entire series may be attached to one hanger and projected, or hung, to the limit of the endurance of the material employed to make the cartridge holders 53.

If desired, the interlocking engagement member 16, instead of being separate, may be formed integral with the cartridge 21 itself. It will also be readily apparent that the location of the dovetail 14 and slot 17 may be interchanged vis-a-vis the parts 10 and 16.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. A storage rack for releasably supporting flat rectangular containers, and the like, each in an upright position and adjacent one another in a horizontal stack, said storage rack including: a flat base member adapted to be secured to the horizontal underside of a support structure; a plurality of adapter pieces suspended in side-by-side relationship from the underside of said base member, the top of each said adapter piece and the underside of said base member having mating grooves and rails so that each said adapter piece is in a slidable fit with said base member to be removably supported thereby, said adapter pieces each having at least a channel-like top edge shaped to receive a corresponding edge of the flat container to be supported thereby.

2. The storage rack defined in claim 1 in which the underside of said flat base member and the top side of each said adapter piece have mating dovetailed grooves and rails forming said slidable fit of each said adapter piece and said base member.

3. The storage rack defined in claim 1 in which each said adapter piece includes a top edge having spaced and parallel side walls with ridges therein for slidably receiving mating ridges in the top edge of the container to be supported thereby.

4. The storage rack defined in claim 3 in which said adapter piece has an inverted L-shaped configuration and further includes a side edge, said side edge having clamping means for engaging the end of the container to be supported thereby.

5. The storage rack defined in claim 1 in which each said adapter piece has a C-shaped configuration and further includes channel-shaped side and bottom edges for receiving and holding the container to be supported thereby.

6. The storage rack defined in claim 5 in which each said adapter piece further includes a hinged side edge enclosing the otherwise opened edge thereof.

7. The storage rack defined in claim 6 in which each said adapter piece is formed of resilient plastic resin, and which includes detent means on said hinged side edge to provide a snap fastener closure means therefor.

8. The storage rack defined in claim 1 in which the adjacent side of said adapter pieces includes interlocking grooves and rails.

References Cited

UNITED STATES PATENTS

| | | | |
|---|---|---|---|
| 921,956 | 5/1909 | Danziger | 211—162 |
| 2,608,305 | 8/1952 | Sager. | |
| 2,851,167 | 9/1958 | Rosenberg | 211—162 XR |
| 2,987,364 | 6/1961 | Fall | 312—345 XR |
| 3,273,719 | 9/1966 | Hoffmann | 211—162 XR |
| 3,294,267 | 12/1966 | Schweigert | 211—162 XR |
| 3,051,537 | 8/1962 | Diehl | 312—20 |
| 3,348,668 | 10/1967 | Amatsu | 312—20 |

FOREIGN PATENTS

| | | |
|---|---|---|
| 984,056 | 2/1965 | Great Britain. |

CHANCELLOR E. HARRIS, *Primary Examiner.*

A. FRANKEL, *Assistant Examiner.*

U.S. Cl. X.R.

211—162; 312—107, 345